United States Patent
Johnson (10) Patent No.: US 10,023,043 B2
(45) Date of Patent: Jul. 17, 2018

(54) ADAPTABLE HUB MOTOR AND RELATED SYSTEMS AND METHODS

(71) Applicant: Dane Technologies, Inc., Brooklyn Park, MN (US)

(72) Inventor: Dan Johnson, Medina, MN (US)

(73) Assignee: Dane Technologies, Inc., Brooklyn Park, MN (US)

( * ) Notice: Subject to any disclaimer, the term of this patent is extended or adjusted under 35 U.S.C. 154(b) by 98 days.

(21) Appl. No.: 15/134,091

(22) Filed: Apr. 20, 2016

(65) Prior Publication Data

US 2016/0303964 A1    Oct. 20, 2016

Related U.S. Application Data (60) Provisional application No. 62/150,075, filed on Apr. 20, 2015.

(51) Int. Cl.
| | | |
|---|---|---|
| *B60K 7/00* | (2006.01) | |
| *B62B 5/00* | (2006.01) | |
| *B62B 3/06* | (2006.01) | |

(52) U.S. Cl.
CPC .......... *B60K 7/0007* (2013.01); *B62B 3/0612* (2013.01); *B62B 5/005* (2013.01)

(58) Field of Classification Search
CPC ....... B60K 7/0007; B62B 5/005; B62B 5/004; B62B 3/0612; B60B 37/00; A63C 17/12; A63C 17/226
See application file for complete search history.

(56) References Cited

U.S. PATENT DOCUMENTS

| | | | |
|---|---|---|---|
| 2,726,726 A | 12/1955 | Tourneau | |
| 4,343,564 A * | 8/1982 | Francis | F16D 1/0847 403/362 |
| 4,389,586 A | 6/1983 | Foster et al. | |
| 4,505,031 A * | 3/1985 | Colwell | H02K 5/1677 29/596 |
| 5,152,631 A * | 10/1992 | Bauer | B23B 31/1175 403/372 |
| 5,465,802 A * | 11/1995 | Yang | B60K 7/0007 180/65.51 |
| 5,691,584 A | 11/1997 | Toida et al. | |
| 6,260,646 B1 * | 7/2001 | Fernandez | B62B 3/0612 180/12 |
| 6,321,863 B1 * | 11/2001 | Vanjani | B60K 7/0007 180/206.5 |
| 7,249,643 B2 * | 7/2007 | Etzioni | B62M 6/65 180/220 |
| 8,336,654 B1 * | 12/2012 | Licon | B60K 1/00 180/65.1 |

(Continued)

FOREIGN PATENT DOCUMENTS

| | | | | |
|---|---|---|---|---|
| DE | 102013103200 A1 * | 10/2014 | | B60K 1/04 |
| JP | 2009029418 A * | 2/2009 | | B62B 3/0612 |

*Primary Examiner* — James A Shriver, II
*Assistant Examiner* — Steve Clemmons
(74) *Attorney, Agent, or Firm* — Davis, Brown, Koehn, Shors & Roberts, P.C.; Sean D. Solberg (57) ABSTRACT

The various embodiments disclosed herein relate to an adaptable hub motor having two or more adaptor sleeves that allow for the hub motor to be attached to or incorporated into various different types of pallet jacks. Other implementations relate to a kit having a hub motor and two or more adaptor sleeves for such use.

19 Claims, 6 Drawing Sheets

(56) References Cited

U.S. PATENT DOCUMENTS

| | | | |
|---|---|---|---|
| 8,991,274 B2* | 3/2015 | Tuttle | B60K 25/00 |
| | | | 180/53.1 |
| 9,227,690 B1* | 1/2016 | Becker | B62K 25/02 |
| 9,636,992 B2* | 5/2017 | Biderman | B60L 15/20 |
| 9,656,700 B2* | 5/2017 | Eidelson | B62D 51/001 |
| 2002/0100625 A1* | 8/2002 | Beltrame | B62B 5/0026 |
| | | | 180/65.51 |
| 2007/0080002 A1 | 4/2007 | Liao | |
| 2014/0291594 A1 | 10/2014 | Newell | |
| 2016/0144709 A1* | 5/2016 | Block | B60K 7/0007 |
| | | | 301/6.5 |
| 2017/0050832 A1* | 2/2017 | Newell | B62B 3/0612 |
| 2017/0253283 A1* | 9/2017 | Eidelson | B23P 6/00 |

* cited by examiner

ADAPTABLE HUB MOTOR AND RELATED SYSTEMS AND METHODS

CROSS-REFERENCE TO RELATED APPLICATION(S)

This application claims the benefit under 35 U.S.C. § 119(e) to U.S. Provisional Application 62/150,075, filed Apr. 20, 2015 and entitled "Hub Motor," which is hereby incorporated herein by reference in its entirety.

FIELD OF THE INVENTION

The various embodiments herein relate to improved motors for use with carts and pallet jacks, and more specifically to adaptable hub motors for use in carts and pallet jacks.

BACKGROUND OF THE INVENTION

Figure 1A:
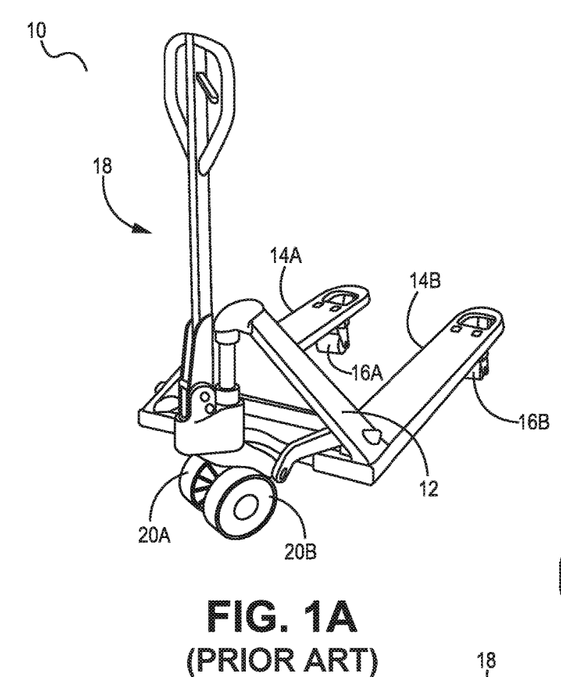
FIG. 1A is a perspective rear view of a known pallet jack.
Figure 1B:
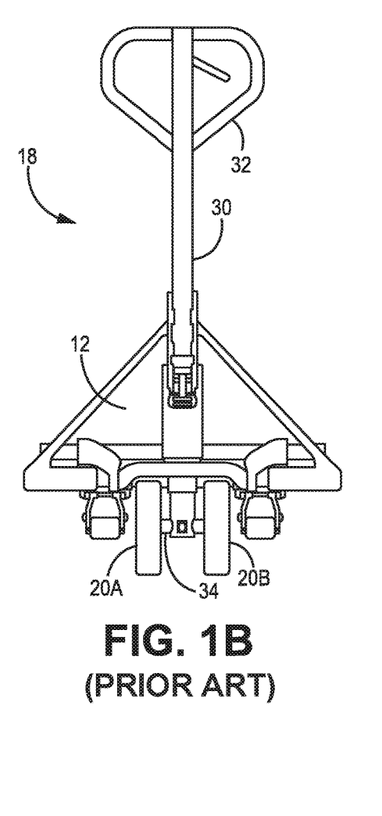
FIG. 1B is a rear view of the known pallet jack of FIG. 1A.

There are multiple manual and motorized pallet jacks on the market. One example of such a manual jack is shown in FIGS. 1A and 1B, which depict standard pallet jack 10. The jack 10 has a body 12, two pallet forks 14A, 14B extending from the body 12, two fork wheels 16A, 16B at the distal ends of the forks 14A, 14B, a steering mechanism 18, and two swivel wheels 20A, 20B operably coupled to the steering mechanism 18.

The steering mechanism 18 has an elongate member 30 and a handle 32. As best shown in FIG. 1B, the two swivel wheels 20A, 20B are coupled to the elongate member 30 of the steering mechanism 18 via a fixed axle 34, which is fixedly coupled to the elongate member 30. Each of the swivel wheels 20A, 20B rotate around the fixed axle 34. When the steering mechanism 18 is urged to the right or left by a user, thereby rotating the elongate member 30, the rotation of the elongate member 30 causes the fixed axle 34 to rotate around an axis parallel to the elongate member 30, thereby causing the wheels 20A, 20B to swivel. This action allows the user to steer the pallet jack 10.

In some rare circumstances, manual pallet jacks such as the one described above are modified to add a motor that can be used to propel the jack, thereby reducing the amount of effort required by the user. However, such modifications are unusual and there are very few commercial options available for such a retro-fitting, probably because the known commercial options are not optimal. One of the few known options is a product called the Power Pallet™, which is available from PowerHandling Inc, of Spokane, Wash. One of the disadvantages of this product is that it doesn't fit all manual pallet jacks. Another disadvantage is that the product is mounted on the front of the handle and swivel wheels of the pallet jack and extends from the front, thereby increasing the size and footprint thereof. This increase to the overall size and footprint of the pallet jack handle causes interference between the Power Pallet product on the handle and the jack itself when a user attempts to turn, thereby making it difficult to steer the jack.

There is a need in the art for an improved hub motor that is adaptable.

BRIEF SUMMARY OF THE INVENTION

Discussed herein are various embodiments of adaptable hub motors.

In Example 1, an adaptable hub motor comprises a cylindrical motor body comprising a motor lumen defined through the motor body and a first adaptor sleeve. The motor body is operably coupled to a wheel such that actuation of the motor body causes rotation of the wheel. The first adaptor sleeve comprises a first cylindrical sleeve body, a first sleeve lumen defined within the sleeve body, and a first coupling component disposed on the outer diameter of the sleeve body. The first cylindrical sleeve body has a predetermined outer diameter such that the sleeve body is sized to fit into the motor lumen. The first sleeve lumen has a first predetermined inner diameter such that the sleeve lumen is sized to fit over an axle of a first pallet jack. The coupling component is configured to facilitate coupling with the motor lumen.

Example 2 relates to the hub motor according to Example 1, further comprising a second adaptor sleeve comprising a second sleeve lumen defined within a second cylindrical sleeve body, wherein the second sleeve lumen has a second predetermined inner diameter such that the second sleeve lumen is sized to fit over an axle of a second pallet jack.

Example 3 relates to the hub motor according to Example 1, further comprising an elongate wired connection operably coupled to the first adaptor sleeve.

Example 4 relates to the hub motor according to Example 3, wherein the elongate wired connection is operably coupled to a controller and a power source.

Example 5 relates to the hub motor according to Example 1, further comprising at least one locking mechanism configured to fixedly couple the first cylindrical sleeve body to the axle of the first pallet jack.

In Example 6, an adaptable hub motor kit comprises a hub motor comprising a cylindrical motor body comprising a motor lumen defined through the motor body, a first adaptor sleeve, and a second adaptor sleeve. The motor body is operably coupleable to a wheel such that actuation of the motor body causes rotation of the wheel. The first adaptor sleeve comprises a first cylindrical sleeve body, a first sleeve lumen defined within the first sleeve body, and a first coupling component disposed on the outer diameter of the sleeve body. The first cylindrical sleeve body has a predetermined outer diameter such that the sleeve body is sized to fit into the motor lumen. The first sleeve lumen has a first predetermined inner diameter such that the sleeve lumen is sized to fit over an axle of a first pallet jack. The coupling component is configured to facilitate coupling with the motor lumen. The second adaptor sleeve comprises a second cylindrical sleeve body, a second sleeve lumen defined within the second sleeve body, and a second coupling component disposed on the outer diameter of the second sleeve body. The second cylindrical sleeve body has a predetermined outer diameter such that the sleeve body is sized to fit into the motor lumen. The second sleeve lumen has a second predetermined inner diameter such that the second sleeve lumen is sized to fit over an axle of a second pallet jack, wherein the second sleeve lumen has a diameter that is different from a diameter of the first sleeve lumen. The second coupling component is configured to facilitate coupling with the motor lumen.

Example 7 relates to the hub motor kit according to Example 6, further comprising a first elongate wired connection operably coupled to the first adaptor sleeve.

Example 8 relates to the hub motor kit according to Example 7, wherein the elongate wired connection is operably coupled to a controller and a power source.

Example 9 relates to the hub motor kit according to Example 6, further comprising a second elongate wired connection operably coupled to the second adaptor sleeve.

Example 10 relates to the hub motor kit according to Example 6, wherein the first coupling component comprises a first set of ribs or threads and the second coupling component comprises a second set of ribs or threads.

Example 11 relates to the hub motor kit according to Example 6, further comprising at least one first locking mechanism configured to fixedly couple the first cylindrical sleeve body to the axle of the first pallet jack, and at least one second locking mechanism configured to fixedly couple the second cylindrical sleeve body to the axle of the second pallet jack.

In Example 12, an adaptable hub motor kit comprises a hub motor comprising a cylindrical motor body comprising a motor lumen defined through the motor body, and a plurality of adaptor sleeves. The motor body is operably coupleable to a wheel such that actuation of the motor body causes rotation of the wheel. Each of the plurality of adaptor sleeves comprises a cylindrical sleeve body having a predetermined outer diameter such that the sleeve body is sized to fit into the motor lumen, an sleeve lumen defined within the cylindrical sleeve body, wherein the sleeve lumen has a predetermined inner diameter, and a coupling component disposed on the outer diameter of the sleeve body, wherein the coupling component is configured to facilitate coupling with the motor lumen. The predetermined inner diameter of each of the plurality of adaptor sleeves is different such that each of the plurality of adaptor sleeves is sized to fit over an axle of a different pallet jack in relation to each of the other adaptor sleeves of the plurality of adaptor sleeves.

Example 13 relates to the hub motor kit according to Example 12, further comprising an elongate wired connection operably coupled to one of the plurality of adaptor sleeves.

Example 14 relates to the hub motor kit according to Example 13, wherein the elongate wired connection is operably coupled to a controller and a power source.

Example 15 relates to the hub motor kit according to Example 12, wherein the coupling component comprises a first set of ribs or threads.

Example 16 relates to the hub motor kit according to Example 12, wherein each of the plurality of adaptor sleeves further comprises at least one locking mechanism.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

The various embodiments disclosed and contemplated herein relate to a hub motor, including, in some implementations, an adaptable hub motor that can be incorporated into a pallet jack. According to certain exemplary embodiment, the adaptability of the hub motor is accomplished through the use of one or more appropriate adaptor sleeves, as will be explained in further detail below. In certain embodiments, the hub motor and adaptor sleeve can be incorporated into a standard and/or pre-existing manual pallet jack, thereby "motorizing" the pallet jack. That is, a manual pallet jack that is moved by a user pushing the jack can be converted into a motorized pallet jack by installing a hub motor and adaptor sleeve according to any of the embodiments disclosed herein. Alternatively, certain embodiments relate to a pallet jack that is constructed with the hub motor and adaptor sleeve incorporated therein.

The fixed axles with swivel wheels on most commercial manual pallet jacks (like the fixed axle 34 and swivel wheels 20A, 20B discussed above) differ in size across different models and brands. That is, there is no standard fixed axle diameter or length within the manual pallet jack industry, so various different pallet jack brands (and models) have fixed axles that vary widely in both the diameter and length, thereby making it almost impossible to manufacture a single hub motor that can be used with all the different brands. The various adaptable hub motor embodiments disclosed or contemplated herein make it possible to couple or otherwise install such embodiments on most—if not all—commercial manual pallet jacks without increasing the size or footprint of any portion of those jacks.

Figure 2:
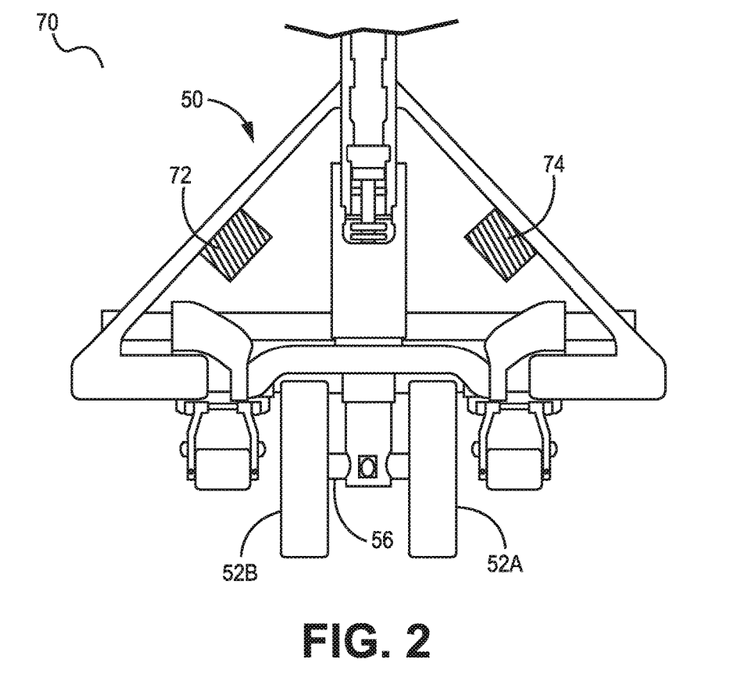
FIG. 2 is a rear view of an adaptable hub motor on a pallet jack, according to one embodiment.
Figure 3A:
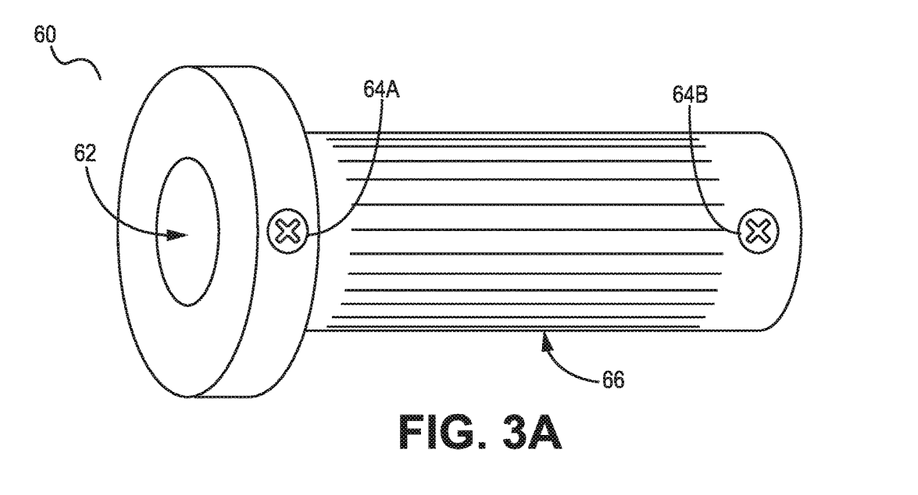
FIG. 3A is a perspective view of an adaptor sleeve, according to one embodiment.
Figure 3B:
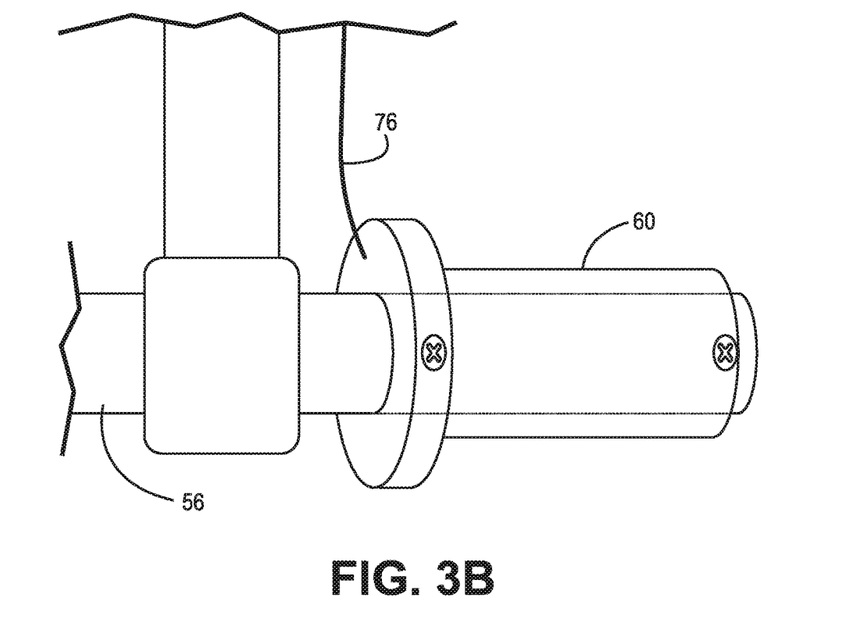
FIG. 3B is a perspective view of the adaptor sleeve of FIG. 3A positioned on a fixed axle of a pallet jack, according to one embodiment.
Figure 4:
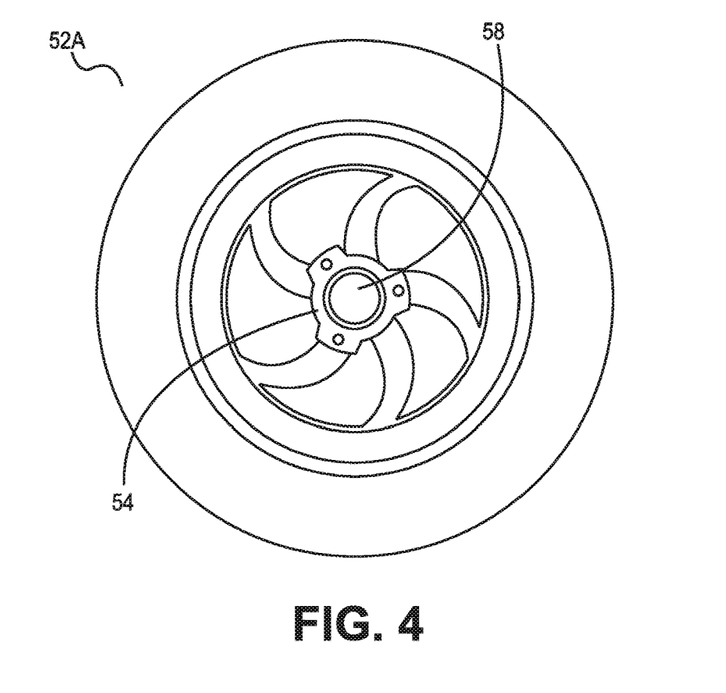
FIG. 4 is a side view of a wheel and hub motor, according to one embodiment.

As best shown in FIGS. 2-4, one embodiment relates to a system 70 in which a manual pallet jack 50 can be retro-fitted with a motor by removing one of the existing swivel wheels on the jack 50 and replacing it with an adaptor sleeve 60 that can be positioned over and attached to the fixed axle 56 of the jack 50 and a hub motor 54 (attached to a wheel 52A) that can be positioned over the adaptor sleeve 60.

FIG. 2 depicts the system 70 having a pallet jack 50 with a new wheel 52A having a hub motor 54 installed thereon, wherein the wheel 52A and hub motor 54 are best shown in FIG. 4. The hub motor 54 has a lumen 58 defined therein. In this embodiment, as discussed above, the previous wheel (similar to wheel 20B discussed above) is removed from the fixed axle 56 and replaced with the adaptor sleeve 60 positioned on and attached to the fixed axle 56 and the wheel 52A having the hub motor 54 is positioned on or over the adaptor sleeve 60 such that the sleeve 60 is positioned in the lumen 58 of the motor 54. Alternatively, if the pallet jack 50 is originally constructed as a motorized pallet jack 50 (rather than being a manual jack that is retro-fitted), the adaptor sleeve 60 is positioned on the fixed axle 56 and the hub motor 54 is installed thereon with right wheel 52A. As such, in this specific implementation, only the right wheel 52A has a hub motor 54, while the left wheel 52B is a standard wheel without a motor. Alternatively, both wheels 52A, 52B can have hub motors.

As mentioned above, the use of any hub motor embodiment disclosed or contemplated herein (including, for example, the hub motor 54 discussed above) with various different types of pallet jacks is possible through the use of the adaptor sleeve that is used in combination with the motor. One example of such a hub motor adaptor sleeve 60, according to one implementation, is shown in FIGS. 3A and 3B. The adaptor sleeve 60—like all the adaptor embodiments disclosed or contemplated herein—couples the hub motor (such as hub motor 54) to the fixed axle of the pallet jack (such as fixed axle 56).

The adaptor sleeve 60 is a cuff, casing, sheath, or cylinder 60 that has an inner lumen 62 that allows the adaptor sleeve 60 to be positioned over the fixed axle of a pallet jack, such as fixed axle 56, as best shown in FIG. 3B. In addition, the adaptor sleeve 60 has two locking screws 64A, 64B as best shown in FIG. 3A that are used to fixedly couple the adaptor sleeve 60 to the fixed axle 56 such that the adaptor sleeve 60 does not rotate in relation to the fixed axle 56. Alternatively, any other known fixation components or mechanisms can be used to couple the adaptor sleeve 60 to the axle 56.

As best shown in FIG. 3A, in certain implementations, the outer diameter of the adaptor sleeve 60 can have a coupling component 66 coupled to or defined on the outer surface of the sleeve 60 that enhances the coupling between the sleeve 60 and the hub motor 54 such that the hub motor 54 can rotate in relation to the sleeve 60. That is, the coupling component 66 ensures that the hub motor 54 is sufficiently coupled to the adaptor sleeve 60 to reduce or eliminate the risk of slippage when the hub motor 54 is rotating in relation to the sleeve 60. In the specific example depicted, the coupling component 66 is a set of slots, ribs, threads, or grooves 66 that are mateable with an equivalent set of slots, ribs, threads, or grooves defined in the inner lumen 58 of the hub motor 54, thereby enhancing the coupling of the sleeve 60 and the motor 54. Alternatively, the coupling component 66 can be any known coupling component, including any mechanical, magnet, or other type of coupling component, that can enhance the coupling between the adaptor sleeve 60 and the motor 54.

In order to ensure that the hub motor (such as hub motor 54) can be retro-fitted onto most known manual pallet jacks (or alternatively installed in new pallet jacks during manufacture), according to certain embodiments, multiple adaptor sleeves 60 are provided with the hub motor 54, thereby allowing the hub motor 54 to be installed on a variety of pallet jacks having fixed axles of varying diameters and lengths. Thus, the lumen 62 of each adaptor sleeve 60 in a set of sleeves 60 has a different, predetermined inner diameter that is configured to fit over a fixed axle with an outer diameter of similar size, while the outer diameter of every adaptor sleeve 60 is the same and is configured to allow the hub motor 54 to fit over the sleeve 60. As a result, the hub motor 54 and any hub motor embodiment contemplated herein can be installed on or integrated into most known pallet jacks by selecting the appropriate adaptor sleeve 60 with the lumen 62 having the appropriate inner diameter to fit over the fixed axle of the pallet jack.

It is understood that, in certain embodiments, the system 70 can be installed onto any known manual pallet jack or integrated into a motorized pallet jack and contains additional components. For example, as shown in FIG. 2, the system 70 has a power source 72 and a controller 74 that are operably coupled to the adaptor sleeve 60 and hub motor 54. Further, the system 70 also has a throttle or other type of actuation control (not shown) that can control speed and/or direction (forward and reverse). The actuation control (not shown) is located on or near the handle of the pallet jack (such as, for example, handle 32 of the pallet jack 10 discussed above and depicted in FIG. 1B). In one implementation, the power source 72 is a battery 72. Alternatively, any known power source can be used. According to certain implementations, the controller 74 is an external controller 74 as shown. Alternatively, the controller can be an internal controller that is positioned inside the hub motor 54. In one embodiment, the controller 74 is a processor 74. Alternatively, any known controller can be used.

In one specific example, the power source 72 and controller 74 can be coupled to the hub motor 54 via a cable and the adaptor sleeve 60. That is, a cable or other elongate wired connection such as the cable 76 depicted in FIG. 3B couples the adaptor sleeve 60 to the power source 72 and controller 74. In this embodiment, when the hub motor 54 is positioned over the adaptor sleeve 60, the motor 54 and sleeve 60 are coupled such that electrical and electronic communication can occur between the motor 54 and the sleeve 60 via the physical connection between the motor 54 and sleeve 60 or any other known connection, thereby allowing transmission to the motor 54 of electrical power from the power source 72 and electronic communication from the external controller 74. Alternatively, the cable 76 can be coupled directly to a stationary portion of the hub motor 54.

Figure 5A:
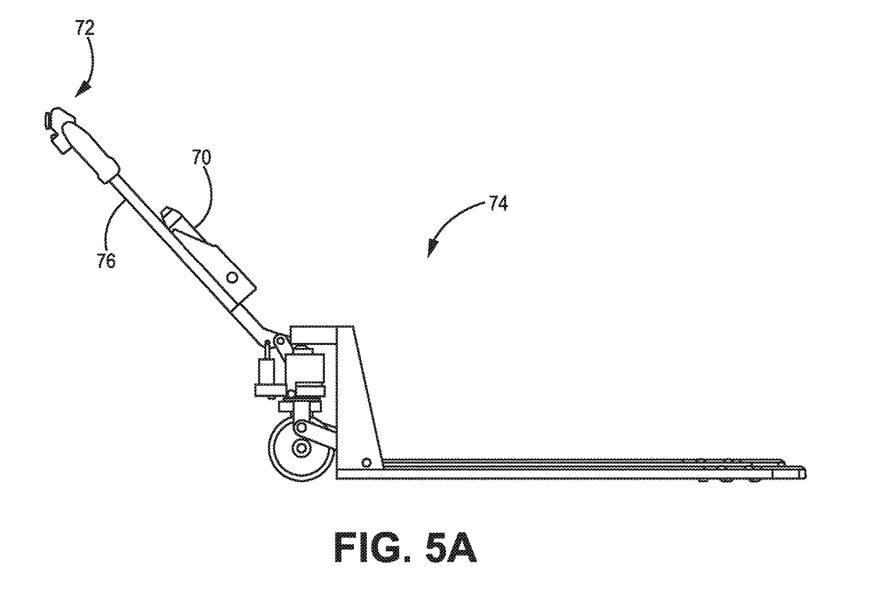
FIG. 5A is a side view of a pallet jack with a power source and operational controls for an adaptable hub motor, according to one embodiment.
Figure 5B:
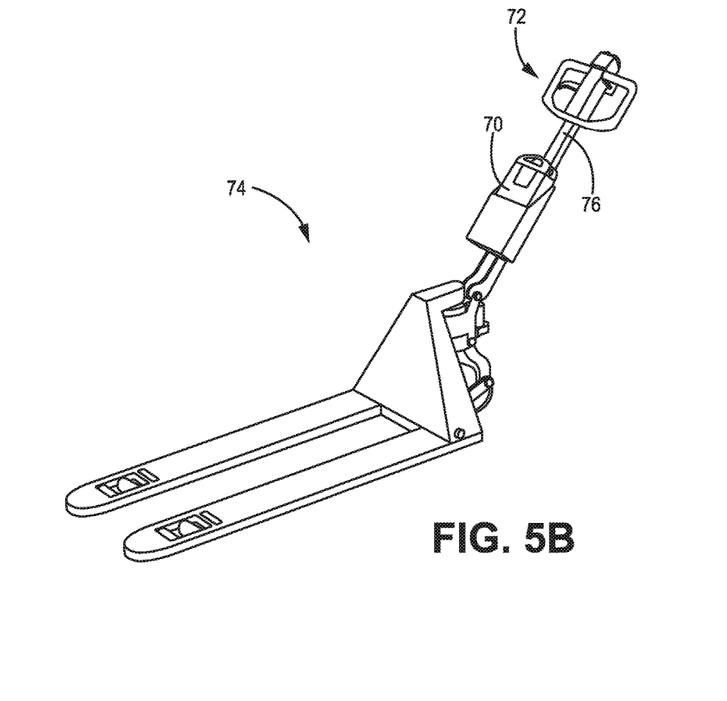
FIG. 5B is a perspective view of the pallet jack with the power source and operational controls of FIG. 5A.
Figure 5C:
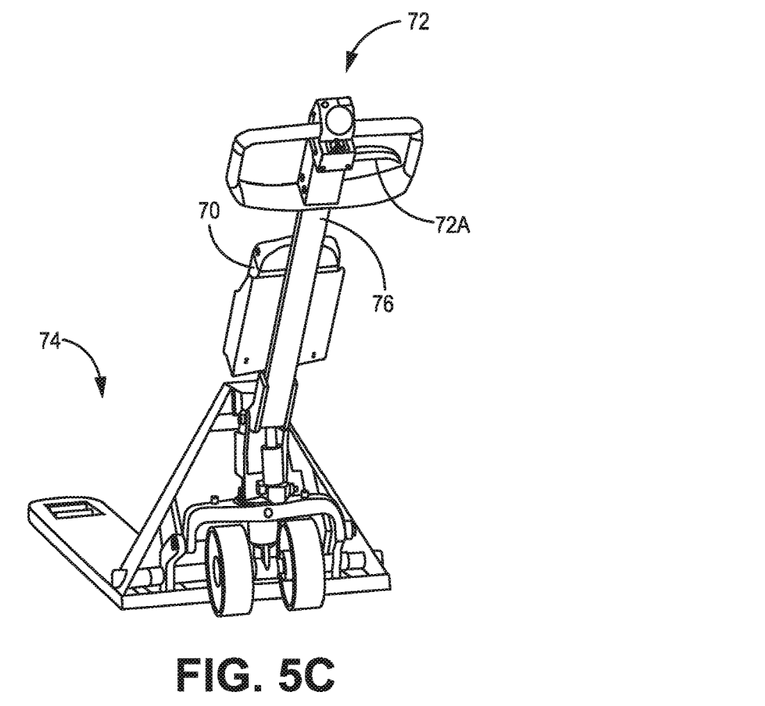
FIG. 5C is a rear perspective view of the pallet jack with the power source and operational controls of FIG. 5A.
Figure 5D:
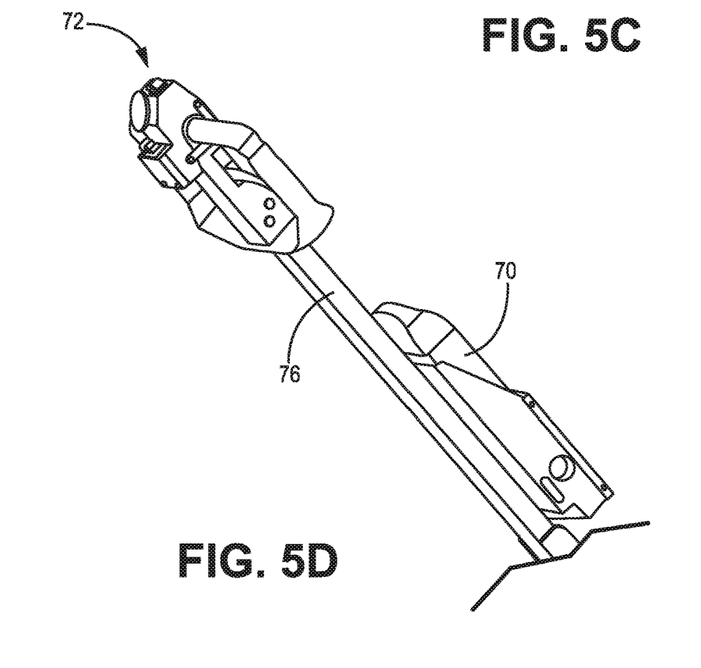
FIG. 5D is a perspective view of the handle of the pallet jack with the power source and operational controls of FIG. 5A.
Figure 5E:
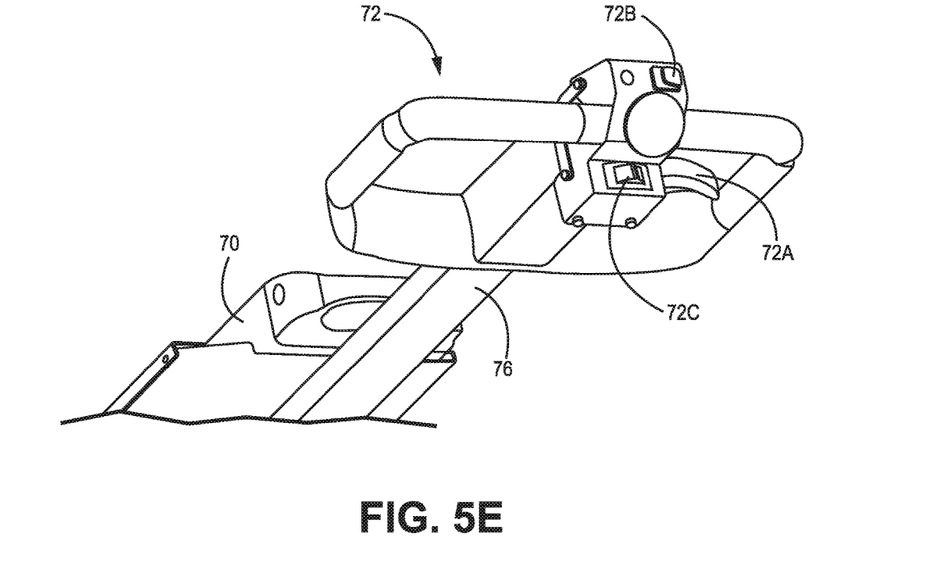
FIG. 5E is a perspective view of the handle of pallet jack with the power source and operational controls of FIG. 5A.

FIGS. 5A-5E depict a further embodiment of a power source 70 and operational controls 72 for an adaptable hub motor (not shown) according to any of the implementations disclosed or contemplated herein. The power source 70 in this example is a battery 70 that is attached to the handle 76 of the pallet jack 74 along the length of the handle 76 as best shown in FIGS. 5A-5D. In certain alternative embodiments, the controller (not shown) can be incorporated into or adjacent to the battery 70. Further, as best shown in FIGS. 5C and 5E, the controls 72 can include a throttle 72A, an on/off switch 72B, and a forward/reverse switch 72C. In this implementation, the battery 70 and the controls 72 can be retrofitted onto a manual pallet jack 74 by attaching those components to the handle 76 as shown. Alternatively, the battery 70 and controls 72 can be incorporated into a new pallet jack 74 during manufacture of the jack 74.

Although the present invention has been described with reference to preferred embodiments, persons skilled in the art will recognize that changes may be made in form and detail without departing from the spirit and scope of the invention.

What is claimed is:

1. An adaptable hub motor comprising:
   (a) a cylindrical motor body comprising a motor lumen defined through the motor body, wherein the motor body is operably coupled to a wheel such that actuation of the motor body causes rotation of the wheel;
   (b) a first adaptor sleeve comprising:
      (i) a first cylindrical sleeve body having a predetermined outer diameter such that the sleeve body is sized to fit into the motor lumen;
      (ii) a first sleeve lumen defined within the sleeve body, wherein the first sleeve lumen has a first predetermined inner diameter such that the sleeve lumen is sized to fit over an axle of a first pallet jack; and (iii) a first coupling component disposed on the outer diameter of the sleeve body, wherein the coupling component is configured to facilitate coupling with the motor lumen; and (c) an elongate wired connection operably coupled to the first adaptor sleeve.

2. The hub motor of claim 1, further comprising a second adaptor sleeve comprising a second sleeve lumen defined within a second cylindrical sleeve body, wherein the second sleeve lumen has a second predetermined inner diameter such that the second sleeve lumen is sized to fit over an axle of a second pallet jack.

3. The hub motor of claim 1, wherein the elongate wired connection is operably coupled to a controller and a power source.

4. The hub motor of claim 1, further comprising at least one locking mechanism configured to fixedly couple the first cylindrical sleeve body to the axle of the first pallet jack.

5. The adaptable hub motor of claim 1, wherein the first coupling component comprises a first set of ribs or threads.

6. The adaptable hub motor of claim 1, further comprising a second coupling component disposed on a surface of the motor lumen, wherein the second coupling component is mateable with the first coupling component.

7. The adaptable hub motor of claim 6, wherein the first and second coupling components are constructed and arranged to allow transmission of electrical and electronic communications between the first adaptor sleeve and the cylindrical motor body via the first and second coupling components.

8. The adaptable hub motor of claim 1, wherein the cylindrical motor body is rotatable around the first adaptor sleeve.

9. The adaptable hub motor of claim 1, wherein the elongate wired connection is operably coupled to a controller.

10. The adaptable hub motor of claim 1, wherein the elongate wired connection is operably coupled to a power source.

11. An adaptable hub motor kit comprising:

(a) a hub motor comprising a cylindrical motor body comprising a motor lumen defined through the motor body, wherein the motor body is operably coupleable to a wheel such that actuation of the motor body causes rotation of the wheel;

(b) a first adaptor sleeve comprising:
 (i) a first cylindrical sleeve body having a predetermined outer diameter such that the sleeve body is sized to fit into the motor lumen;
 (ii) a first sleeve lumen defined within the first sleeve body, wherein the first sleeve lumen has a first predetermined inner diameter such that the sleeve lumen is sized to fit over an axle of a first pallet jack; and
 (iii) a first coupling component disposed on the outer diameter of the sleeve body, wherein the coupling component is configured to facilitate coupling with the motor lumen;

(c) a first elongate wired connection operably coupled to the first adaptor sleeve; and (d) a second adaptor sleeve comprising:
 (i) a second cylindrical sleeve body having a predetermined outer diameter such that the sleeve body is sized to fit into the motor lumen;
 (ii) a second sleeve lumen defined within the second sleeve body, wherein the second sleeve lumen has a second predetermined inner diameter such that the second sleeve lumen is sized to fit over an axle of a second pallet jack, wherein the second sleeve lumen has a diameter that is different from a diameter of the first sleeve lumen; and
 (iii) a second coupling component disposed on the outer diameter of the second sleeve body, wherein the second coupling component is configured to facilitate coupling with the motor lumen.

12. The hub motor kit of claim 11, wherein the first elongate wired connection is operably coupled to a controller and a power source.

13. The hub motor kit of claim 11, further comprising a second elongate wired connection operably coupled to the second adaptor sleeve.

14. The hub motor kit of claim 11, wherein the first coupling component comprises a first set of ribs or threads and the second coupling component comprises a second set of ribs or threads.

15. The hub motor kit of claim 11, further comprising:
(a) at least one first locking mechanism configured to fixedly couple the first cylindrical sleeve body to the axle of the first pallet jack; and
(b) at least one second locking mechanism configured to fixedly couple the second cylindrical sleeve body to the axle of the second pallet jack.

16. An adaptable hub motor kit comprising:
(a) a hub motor comprising a cylindrical motor body comprising a motor lumen defined through the motor body, wherein the motor body is operably coupleable to a wheel such that actuation of the motor body causes rotation of the wheel;
(b) a plurality of adaptor sleeves, each of the plurality of adaptor sleeves comprising:
 (i) a cylindrical sleeve body having a predetermined outer diameter such that the sleeve body is sized to fit into the motor lumen;
 (ii) a sleeve lumen defined within the cylindrical sleeve body, wherein the sleeve lumen has a predetermined inner diameter; and
 (iii) a coupling component disposed on the outer diameter of the sleeve body, wherein the coupling component is configured to facilitate coupling with the motor lumen,
wherein the predetermined inner diameter of each of the plurality of adaptor sleeves is different such that each of the plurality of adaptor sleeves is sized to fit over an axle of a different pallet jack in relation to each of the other adaptor sleeves of the plurality of adaptor sleeves; and
(c) an elongate wired connection operably coupled to one of the plurality of adaptor sleeves.

17. The hub motor kit of claim 16, wherein the elongate wired connection is operably coupled to a controller and a power source.

18. The hub motor kit of claim 16, wherein the coupling component comprises a first set of ribs or threads.

19. The hub motor kit of claim 16, wherein each of the plurality of adaptor sleeves further comprises at least one locking mechanism.

* * * * *